United States Patent [19]

Yoshida et al.

[11] Patent Number: 4,958,271

[45] Date of Patent: Sep. 18, 1990

[54] TRANSFER CONTROL EQUIPMENT

[75] Inventors: Shouki Yoshida; Setsuo Shimada, both of Tokyo, Japan

[73] Assignee: NEC Corporation, Tokyo, Japan

[21] Appl. No.: 255,898

[22] Filed: Oct. 11, 1988

Related U.S. Application Data

[63] Continuation-in-part of Ser. No. 806,861, Dec. 9, 1985, abandoned.

[30] Foreign Application Priority Data

| Dec. 7, 1984 [JP] | Japan | 59-257637 |
| Mar. 1, 1985 [JP] | Japan | 60-41396 |
| Mar. 1, 1985 [JP] | Japan | 60-41397 |

[51] Int. Cl.$^5$ ............................................. G06F 13/42
[52] U.S. Cl. ......................... 364/200; 364/240.2; 364/240.5; 364/241.2; 364/271.0; 364/240.8
[58] Field of Search .................. 364/200 MS, 900 MS

[56] References Cited

U.S. PATENT DOCUMENTS

| 3,916,383 | 10/1975 | Malcolm | 364/200 |
| 4,204,251 | 5/1980 | Brudevold | 364/200 |
| 4,234,919 | 11/1980 | Bruce et al. | 364/200 |
| 4,750,111 | 6/1988 | Crosby, Jr. et al. | 364/200 |

*Primary Examiner*—Gareth D. Shaw
*Assistant Examiner*—Maria Napiorkowski
*Attorney, Agent, or Firm*—Sughrue, Mion, Zinn, Macpeak & Seas

[57] ABSTRACT

A system comprising a plurality of common bus systems, each of which has a given priority of use for peripheral units, and a unique transfer unit. When data is transferred from a unit of one of the common bus systems to a unit of another common bus system, the transfer unit acts to supervise the transfer, avoid conflicting requests and satisfy priority transfer requirements. In one embodiment the data is temporarily stored in the transfer control unit. In a second embodiment the transfer control equipment includes a circuit for processing the highest priority transmission and a response circuit for generating dummy responses for lower priority transmissions, e.g. invalid or wait responses. In a third embodiment the transfer control unit includes a request circuit for sending the transfer request signal to another common bus and a circuit for assuring that the time period during which the address and data which is sent is within a predetermined time.

9 Claims, 5 Drawing Sheets

TRANSFER CONTROL EQUIPMENT

This is a continuation-in-part of application Ser. No. 06/806,861 filed Dec. 9, 1985, now abandoned.

BACKGROUND OF THE INVENTION

The present invention relates to transfer control equipment for common use of an input/output bus by individual peripheral units, including a CPU. The equipment further controls the transfer of information between two common input/output buses, each of which has an individual "use right" in a data processing system.

A first conventional system for transferring information from one common bus to another will store data from a first common bus in a common memory connected between the two buses by a single path. The system will read the data from the common memory and transfer the data to a second common bus. The entire transfer operation is under control of a CPU connected to one of the buses. This system is not desirable since the CPU must interrupt its processing in order to accomplish this transfer.

In a second conventional system, the two common input/output buses are connected by individual connecting equipment, which replaces the common memory of the first conventional system. In this embodiment, data to be transferred from a first common bus is temporarily stored by a local memory unit attached to that bus. Then, the data is transferred from the local memory to the connecting equipment, via the connecting bus, to the second common bus. If a significant quantity of data is transferred, the first bus is occupied a substantial amount of time, so that the efficiency of the use of the bus and the performance of the CPU connected to the first bus are decreased.

A problem with data transfer on any common bus is conflict between the transfer request from one unit and the transfer request from another unit. To solve the problem, in the second conventional unit, the bus connecting equipment will receive and store the entire block of information to be transferred and will terminate the use of the bus. Clearly, the bus connecting equipment must have a memory large enough to store the content of bus transfer and an increase in the amount of data to be transferred requires a larger memory. Moreover, if there are several such memories, on the occurrence of malfunction, the recovery process becomes more complex.

In the second conventional unit, when the bus connecting equipment receives a transfer from a unit on the first bus, including the address of the destination unit, the original CPU initially determines by a comparison process whether there is a unit having an identical address that is connected to the second common bus. If there is a unit with the identical address, a bus use request signal is sent to the second common bus. Such a transfer control system is disclosed in U.S. Pat. No. 4,234,919. In the system described in that patent, the address of the destination unit is generated by a unit on the first common bus, is stored in the local memory and is compared. If the comparison is positive, then the address is sent from the local unit to the second common bus. However, if a new unit is connected to the second common bus, or if a unit connected to the second bus is changed or deleted, the content of the memory must be changed.

SUMMARY OF THE INVENTION

It is therefore an object of the present invention to provide a new transfer control unit to improve the performance of a CPU and to increase the efficiency with which a common input/output bus is used.

It is another object of the present invention to provide a transfer control unit having a simple recovery in the event of a malfunction of the unit.

It is a further object of the present invention to provide a transfer control unit which is able to adapt to changes in system architecture.

According to one embodiment of the present invention, a single transfer control unit is connected between two common buses. Each of the buses connects a central processing unit (CPU) and a plurality of peripheral units (PU) into a common bus system. The transfer control unit is adapted to read data from the CPU or a PU, or to write data into the CPU or a PU. The transfer control unit includes a decision circuit for identifying an input/output instruction from a common bus on one side of the unit and a transmission circuit for transmitting the unit address, data and control signals necessary to execute that input/output instruction to a common bus on the opposite side of the unit. The unit also includes a large common memory circuit that operates independent of CPU output instructions from either common bus.

According to a second embodiment of the present invention, there is provided a transfer control unit connected to a plurality of common input/output bus systems on each side of the unit. Each of the common input/output bus systems comprises a common input/output bus in combination with a memory unit, a central processing unit or any one of a plurality of peripheral units. In each system, a destination address, a command signal, a data and a response signal is transmitted in conversation form among the units via the common bus. In this second embodiment, each of the common input/output bus systems has an individual bus "use right", that is, a priority rank as among other bus systems The transfer control unit comprises a decision circuit for deciding whether the content from a first common input/output bus should be transmitted to a second common input/output bus, in response to address, data and control signals from the first common input/output bus. If the decision circuit decides that the content from the first common input/output bus should be transmitted to the second common input/output bus, a detection circuit then determines whether the transfer requests from a plurality of other common input/output bus systems will interfere with the transfer from the first bus to the second bus. To this end, the detection circuit monitors the state of the other common input/output bus systems. The state of each bus system is monitored by a collision control circuit which outputs a "use right" request signal to all other common input/output bus systems if the detection circuit does not identify an interference condition. The detection circuit also outputs a dummy response control signal to those common input/output bus systems having a lower priority as among the plurality of common input/output bus systems when an interference condition is detected. A dummy response control circuit generates the dummy response request signal, which indicates an invalid response or wait response to those common input/output buses with lower priority.

According to a third embodiment of the present invention, a transfer control unit is connected to a plurality of common input/output bus systems. As with the second embodiment, each of the common input/output bus systems comprises a memory unit, a central processing unit, a peripheral unit, and a common input/output bus connected to each of the units. In each system a destination address, a command signal, a data, and a response signal is transmitted in conversation form among the units via the common bus. Each of the common input/output bus systems has an individual bus "use right". The transfer control unit includes a time supervision circuit for supervising the response time, during a predetermined period, for a transfer of control signals for sending address and data information from one common bus to the other common bus. The time supervision circuit will permit transfer request signals of a lower priority to pass to other common input/output buses if there has been no response signal after the passage of the predetermined time. If there is a timely response to the transfer request from a second one of the common input/output buses, a minimum time circuit assures that there will be an adequate amount of time reserved for transmitting the data and address from the first common bus to the second common bus.

BRIEF DESCRIPTION OF THE DRAWINGS

The present invention will be described in greater detail with reference to the accompanying drawings, wherein.

DETAILED DESCRIPTION OF THE INVENTION

Figure 1:
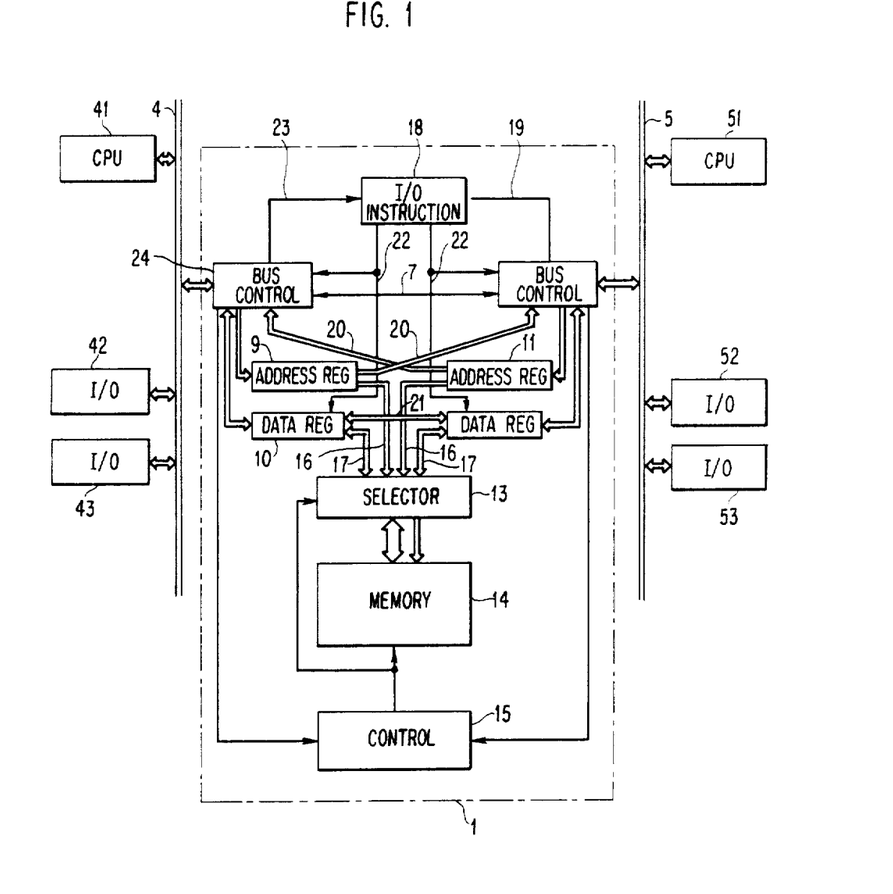
FIG. 1 shows a first embodiment of the present invention.

Referring to FIG. 1, the system involving the present invention comprises a first common bus 4, a CPU 41 connected to the bus 4, input and output units 42 and 43 connected to the bus 4, a second common bus 5, a CPU 51 connected to the bus 5, input and output units 52 and 53 connected to the bus 5, and a transfer control unit 1.

In a first embodiment of the present invention, the transfer control unit 1 comprises address registers 9 and 11, each of which are connected between bus control circuits 24 and 25 via lines 20 to store address information received by the control circuits 24 and 25 from respective common buses 4 and 5. Data registers 10 and 12 also are connected to the control circuits 24 and 25 and to each other in order to store data to be transferred by the unit 1. A selector 13 is connected to address registers 9 and 11 and to data registers 10 and 12 for switching the flow of data to and from common memory 14 via an address bus 16 and a data bus 17. A memory control circuit 15 is connected to bus control circuits 24 and 25 and cooperatively operates to facilitate the storage of data and address information in common memory 14. Bus state signal lines 19 and 23 connect the bus control circuits 24 and 25, respectively, to an input/output instruction detecting circuit 18. Control signal lines 22 communicate command information from circuit 18 to data registers 10 and 12 and to the bus control circuits 24 and 25.

In the first embodiment of the present invention the CPU may provide several different types of instructions, as well as data and address information. Initially, however, it should be noted that the communication process generally involves two steps, a first where a unit will seize a transmission path with a "use right" signal and a second in which address, command and data is transmitted on the path. Viewing the operation with respect to common bus 4, for example, the CPU 41 inputs a command signal to the bus control circuit 24 through the first common bus 4. The command signal designates four kinds of functions, I/O, memory access, write access and read. The control circuit 24 can judge whether the command signal is I/O access or memory access. It also sends the command signal to the instruction detecting circuit 18 through the line 23. If the information from CPU 41 includes address information, the address data on the bus 4 also inputs to the address register 9. When the instruction on the bus 4 is a data input or output instruction (also read access or write access instruction, as described below), the data on the bus also inputs to the data register 10. If a command signal is to be transferred between bus 4 and bus 5, the command on the transmit bus is detected by the bus controller 24 or 25 and is sent directly to the other bus controller 24 or 25 via bus 7. If the bus control circuit 24 designates that an input or output operation is to occur the detecting circuit 18 will send a request for use of the second bus 5 to the bus control circuit 25 through the control signal line 22 and will detect a collision of the request from second bus 5. The detecting circuit 18 also supervises the state of the second bus 5 by the signal from the bus control circuit 25 through the line 19. The detail of the circuits 24 and 25 are further described with respect to the second and third embodiments but for purposes of this explanation, they each comprise a control circuit that establishes a bus "use right", a transfer control circuit, an address input/output circuit, and a data input/output circuit.

In the case where the instruction received by bus control 24 and detected by circuit 18 is an output instruction, the control circuit 25 is so informed and sends the address of the destination unit to the second common bus 5. The instruction, which is given from the data register 10 to the bus control circuit 25, via the data line 21 and the data register 12, is sent to the second common bus 5. The instruction may be sent with a delay or simultaneously with the supply of address data. Each of units 51, 52 and 53 receives the address on the second common bus 5 and decides whether the received address is its own address. If the received address is the same as the address of unit 52 or 53, the unit shown by the received address will then receive the instruction from the bus 5.

In the case that the instruction received by the unit is an output instruction, the unit that received the instruction will notify the CPU 41 that data may be transmitted and then will receive data through bus 4, bus control circuit 24, data register 10 data circuit 21, data register 12, bus control circuit 25 and bus 5. In the case that the instruction received by the unit is an output instruction, the unit that received the instruction will send data onto bus 5. For example, if CPU 41 requests data from a peripheral unit on bus 5, the data is sent to the CPU 41 through the bus control circuit 25, the data register 12, the data circuit 21, the data register 10, the bus control circuit 24 and the first common bus 4.

There are several kinds of instructions that may be used such as an instruction for inputting data or information, an instruction for outputting data or information, an instruction for defining the operation of a peripheral unit, and an instruction for defining the memory address and the number of data for direct memory access (DMA) transformation. The DMA process involves the use of central memory capability involving memory 14, selector 13 and control circuit 15, to store data, address and command information from peripheral units or CPUs during a transfer operation.

The case where the data is transferred and stored into the memory 14 from either the CPU 41 or the input/output units (42 or 43) will be explained. Initially, the operation is under control of CPU 41 but then becomes independent of that CPU. At first, any of the units 41, 42 and 43 establishes a "use right" for the first common bus 4 by notifying other units that it wishes to seize the transmission path. After that, the unit that established the "use right" sends memory address and data information to the first common bus 4 as well as an instruction e.g. a write instruction. The address information in this case identifies a location in memory 14. The circuit 18 identifies the instruction from the CPU 41 as a write instruction and sends the decoded results to the control circuit 24. If the control circuit 24 determines that the command is memory access, it sends the write designation signal to the memory control circuit 15. Control circuit 15 evaluates whether it is a read access or write access signal and the possibility of a conflict between access requests from the first and second common buses 4 and 5, for access to memory 14. If there is no conflict, the memory control circuit 15 sends a select designation signal to the selector 13 so that the selector 13 supplies the contents of the registers 9 and 10 to the memory 14. Also, the memory control circuit 15 sends the write access signal to the memory 14 for storage. As a result, the data from the data register 10 is stored in a location, which is designated by the memory address from the address register 9, in the memory 14. This completes the DMA storage process.

When the procedure for DMA transformation is completed by the instruction from the CPU 41, the input and output units may transfer the data or instruction to the unit 1 without the support of the CPU 41, because all of the data from the bus are temporarily stored in the memory 14. Accordingly, the first embodiment can resolve the problem of excessive dedication of bus 4 to a transfer operation and permit the related CPU 41 to use the bus 4 for other useful purposes. Furthermore, since the first embodiment does not require control by CPU 51 for the transfer and storage operation, CPU 51 can process other jobs or tasks for other purposes.

When, the data stored in the memory 14 is to be read out, CPU 51, which has previously been informed of the storage process and the address in memory 14, becomes involved. Under control of CPU 51 read out instructions, the information stored in unit 1 is sent to the units 51, 52 or 53 connected to the second common bus 5 consistent with the destination address. The instruction from the CPU 51 is given to the circuit 18 via the control circuit 25. The circuit 25 judges whether the command signal designates memory access or I/O access and the circuit 18 decodes the instruction. When the command signal designates memory access, circuit 25 judges whether the command is read access or write access. When the instruction is a DMA read out instruction, the control circuit 25 controls storage of the memory address from the second common bus 5 into the address register 11 and gives the read out designation to the memory control circuit 15. Memory control circuit 15 resolves any conflict for access to memory 14 between the first and second common buses 4 and 5. Assuming the conflict is resolved in favor of priority for bus 5, the memory control circuit 15 sends a selection designating signal to the selector 13 so that the selector 13 supplies the memory address in the address register 11 to the memory 14. Also the memory control circuit 15 gives the read out designation signal to the memory 14. In response to the read out designation signal, the data is read out from the memory 14 to the desired unit 51, 52 or 53, as identified by a stored destination unit address, via the selector 13, the data register 12, the circuit 25, and the bus 5. Of course, the circuit 25 initially establishes the "use right" of the bus 5 before the above data transfer occurs.

In order to permit better understanding of the second and third embodiments according to the present invention, the relationship among the outputs of a destination unit address, the command signal and data, and the response signal, as they appear in FIGS. 3 and 4, will be explained.

Figure 2:
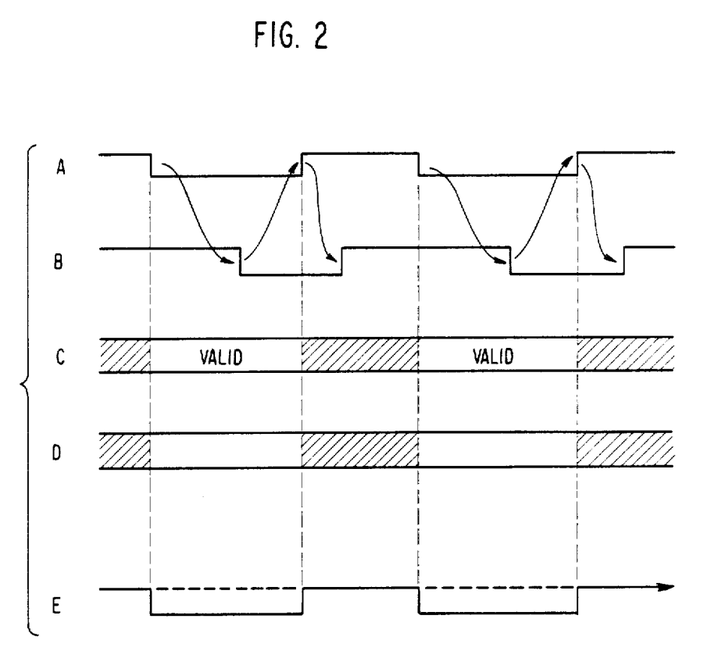
FIG. 2 shows a time chart for explaining the relationship of the destination unit address, command signal, data and the response signal.

The signals shown in FIG. 2 include the following:

A is a data sending control signal that is transmitted by CPU 41 or 51 on lines 102 and 108. The signal is binary and is an input to unit 1 so long as the respective condition exists. For example, the '1" level may indicate that a CPU or peripheral unit intends to transmit address, command and data information; the "0" level may indicate that such condition does not exist.

B is a reply control signal that is transmitted by a responding CPU or peripheral unit on lines 103 and 109. The signal also is binary and is an input to unit 1 so long as the respective condition exists. For example, the "1' level may indicate that data or address information has been received by a responding unit, the "0" level may indicate that no reply is being sent.

C is a sequence of bits that are sent on lines 105 and 111. The signal may be a sequence of bits identifying an address during the "VALID" period and a sequence of "dummy" bits, having no informational content but being of value for timing purposes, at other times.

D is a sequence of bits that are sent on lines 106 and 112. The signal may be a sequence of bits identifying meaningful data during the "VALID" period and a sequence of "dummy" bits, having no informational content, but being of value for timing purposes, at other times.

E is an input/output command signal transmitted on lines 108 and 110.

Referring to FIG. 2, the transfer of data among units connected to a common bus, for example the units 41, 42 and 43 connected to common bus 4 in the first embodiment, can be examined. After setting up the bus "use right" as described above, the destination unit address C and the command signal E are sent on the common bus, synchronized with the sending of the control signal A. In case of outputting data, the output data also is sent as data D on the common bus, synchronized with control signal A. Each unit connected to the common bus, like the units 41, 42, 43 in the first embodiment, decodes the destination unit address, in response to the change, for example, "0" to "1", of the control signal A. When the destination unit address is detected by a unit as its own address, the unit inputs the command signal E. In case of outputting data, the data is also input on to bus 4.

Next, each of the units sends a "notice of input" to the sending unit, in response to the change, for example, "0" to "1", of the reply control signal B. When the sending unit receives the "notice of input" it will change the signal A, for example from "1" to "0". In response to the change of the control signal A, the reply control signal B is changed, for example from "1" to "0" as shown in FIG. 2.

With the above explanation of one bus in mind, a two bus system embodying the second embodiment according to the present invention will be explained in detail. FIGS. 3 and 4 illustrate a bus transfer control unit 3 that embodies the present invention and permits the transfer of signals between common bus 4 and common bus 5. However, first it should be noted that in all of the embodiments there appears to be an identical structure with respect to each bus, its peripheral units and certain corresponding elements of the transfer unit. Indeed, each such bus system may perform the same input and output functions. However, the concurrent operation of each bus system may create a conflict and a priority of operation needs to be established. An example of such a priority feature will be explained for the case where an information transfer from a first bus 4 to the second bus 5 has higher priority than the information transfer from the second bus 5 to the first bus 4.

Figure 3:
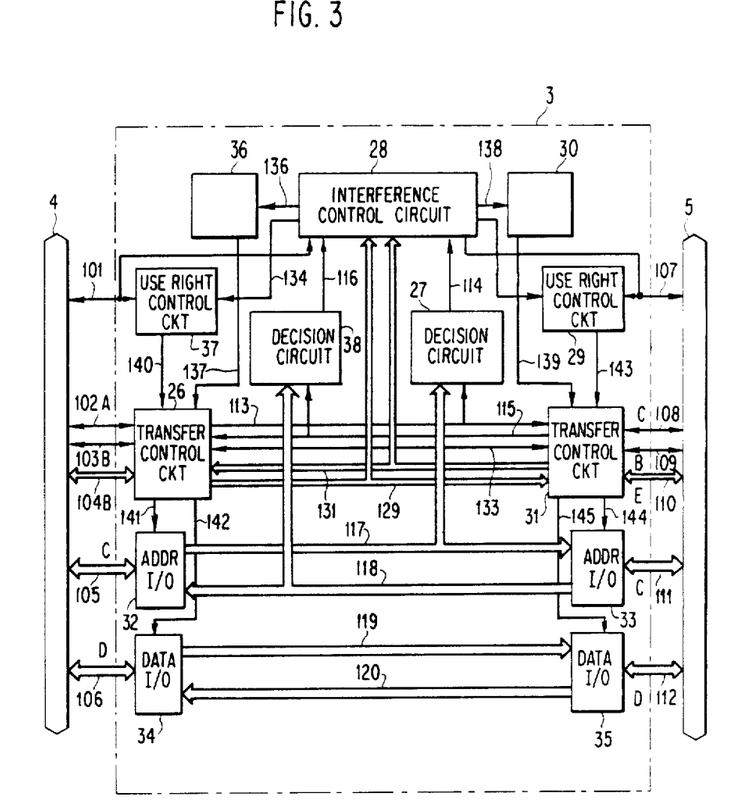
FIG. 3 shows a second embodiment of the present invention.

Referring to FIGS. 1 and 3 for comparison, the bus control circuit 24 in the first embodiment corresponds to a "use right" control circuit 37, a transfer control circuit 26, an address input and output circuit 32, and a data input and output circuit 34 in the second embodiment. The bus control circuit 25 in the first embodiment corresponds to a "use right" control circuit 29, a transfer control circuit 31, an address input and output circuit 33 and a data input and output circuit 35 in the second embodiment.

When a unit connected to the first common bus 4 intends to send an instruction, it changes the signal A (for example from "0" to "1") on a line 102 in order to indicate transmission of data or address. The signal A is forwarded to the decision circuit 27 through the control circuit 26 and a line 113. The decision circuit 27 determines whether the signal A is allowed to be transmitted on the second common bus 5. The decision by circuit 27 is based upon a comparison of the destination unit address as transmitted to all of the addresses of the peripheral units and CPU on bus 5. If there is nor identity of addresses, transmission is not allowed and the signal A is ignored. If allowable, the decision circuit 27 inputs a transmit request signal to an interference control circuit 28 via a signal line 114. The interference control circuit 28 determines whether there is more than one request for buses 4 and 5. To this end, in addition to the signal from circuit 27, the interference control circuit 28 may also receive through a line 116 a transmit request signal from decision circuit 38 for transmitting on the first bus, a "use right" state signal from the second common bus 5 through a line 107 which identifies whether there is a "use right" signal from a unit on bus 5, an internal command signal for the first bus 4 from unit 26 via a line 129, and an internal command signal for the second bus 5 from unit 31 via a line 131. The control circuit 28 supervises the state of the second bus by these several received signals. In response to the request signal from the line 114, the control circuit 28 detects whether there are conflicting requests from both the first and second common bus, and identifies the nature (e.g. read or write) of the bus transmission. If the nature of the bus transmission is not determined, the circuit 28 waits until the nature of it is determined. If the control circuit 28 does not detect a conflict, the control circuit 28 sends to circuit 29 via the line 135 a request for a "use right" on the second bus 5. In response to the request signal, circuit 29 establishes a "use right" on the second bus 5. The other circuit is not enabled but a signal will be sent on lines 136 and 138 to establish a dummy operation for that circuit as further explained below. If control circuit 28 detects a conflict, it signals either line 134 or 135, depending on which transfer has the higher priority, and enables either circuit 37 or 29, respectively.

If circuit 20 enables "use right" control circuit 37 because there is a higher priority of use for its signal, it also sends a dummy response request designation signal for the second bus on line 138. This signal is necessary to maintain the timing of the transfer circuit by circuit 31. In response to the dummy request designation signal, a dummy response control circuit 30 sends a request signal to the transfer control circuit 31 via the line 139. Thus, the dummy signal operates to provide an input to circuit 31 via line 139 rather than 143. In response to the request signal on line 139 and the command signal for the second bus 5 provided on the line 110, the control circuit 31 sends the response of invalidity or waiting to the second bus 5 via the line 109. The lower priority unit connected to the second bus 5 that requested access, temporarily stops its data transmission in response to the response signal from the line 109 and terminates its use of the second bus. However, after such termination, the unit connected to the second bus 5 requests the "use right" again, and awaits the chance to transfer data. In response to this new request, the control circuit 28 makes the same comparison, detects the same conflict and again outputs the dummy response request designation signal to the line 138; this process may continue so long as the conflict exists.

As described above, control circuit 30 transmits a request signal to circuit 31 via line 139 in response to the signal on line 138. However, control circuit 28 also outputs via line 135 to control circuit 29 a request to establish in control circuit 31 a "use right" for the second common bus 5. When control circuit 29 receives the request signal it sends a set up signal to the control circuit 31 via the line 143. The set up signal causes circuit 31 to request a "use right" consistent with the request from the lower priority unit on bus 5.

If no conflict exists or if it is resolved in favor of the highest priority unit on bus 4, the transfer control signal (A) for the first common bus is transmitted from the first common bus 4 to the second common bus 5 through the line 102, the circuit 26, the line 113, the circuit 31 and the line 108. The address (C) is transmitted from the first common bus 4 to the second common bus 5 through the line 105, the circuit 32, the line 117, the circuit 33 and the line 111. Data (D) is also transmitted from the first common bus 4 to the second common bus 5 via the line 106, the circuit 34, the line 119, the circuit 35, and the line 112. The sending operation for data and address is synchronized by the timing signal which is given from the circuit 31 to the circuits 33 and 35 through the lines 144 and 145.

When the data, address and command information is passed from bus 4 to bus 5, an address comparison is made. Each unit connected to the second common bus 5 examines the destination unit address on the address bus. If the address is the address of the unit itself, the unit responds with the response control signal. The signal (B) on the second bus 5 is transmitted to the first common bus 4 through the line 109, the circuit 31, the line 133, the circuit 26 and the line 103. When the response control signal (B) is received by the transmitting unit on bus 4, its transmission is terminated.

In the second embodiment, where there is a conflict between transmission requests, the transfer control unit 28 decides which request should take priority over another request, and sends the dummy invalidity and dummy waiting response signal as discussed above. Circuits 31 and 26 are responsive to these signals and will signal bus 5 and 4, respectively; this operation will terminate the activity of units having a lower priority until the priority transmission is completed. Clearly, with this circuit arrangement a conflict is always avoided and it is not necessary to provide the memory for storing the data or instruction intended for transfer as shown in the first embodiment.

A significant feature of the present invention is its ability to effect a transfer within one bus cycle of one of the two communicating bus systems. Considering the prior explanation of the operation of FIG. 3 and referring further to FIG. 5, a CPU (not shown) connected to the bus 4 sends the signal A on the line 102 at the time point F. The time point F represents the start of one bus cycle. At the time point G, the signal A is transferred to the line 107, through the line 113, the circuit 27, the line 114, the circuit 28, the line 135, and the circuit 29. The signal A is also transferred to the circuit 31 through the line 113. The circuit 31 holds the signal A while the signal A acquires the bus use right for the bus 5.

Figure 5:
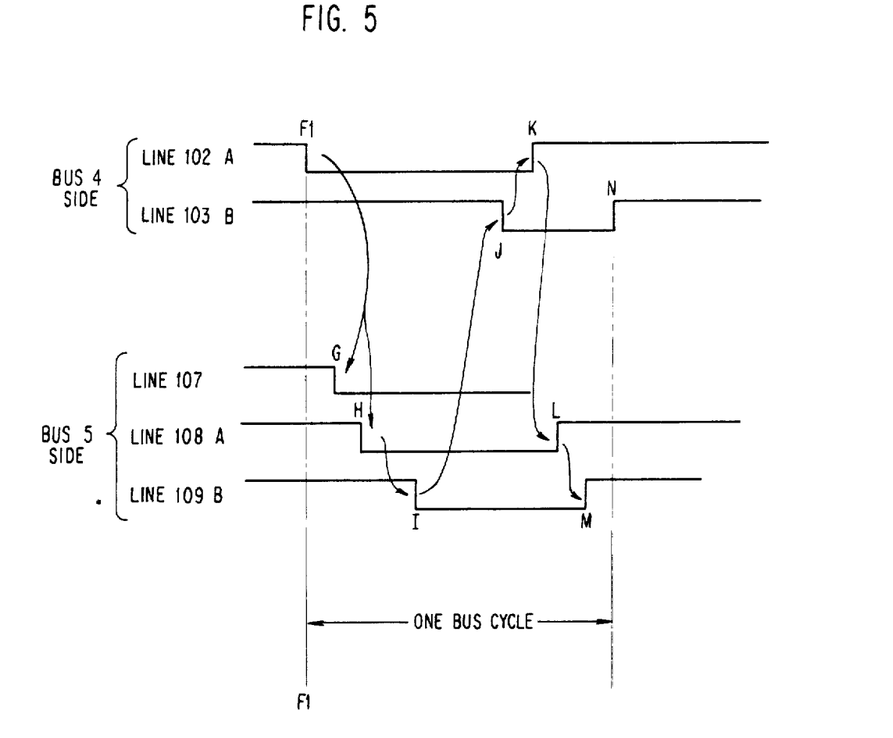
FIG. 5 shows the timing of a communication via the present invention during a single bus cycle.

In response to the acquisition of the bus use right for the bus 5, the circuit 31 sends the signal A to the I/O unit (not shown) through the line 108 and the bus 5 (see time point H).

The I/O unit (not shown) connected to the bus 5 then sends the signal B to the line 109 through the bus 5 at the time point I. The signal B on the line 109 is next transferred to the line 103 through the circuit 31, the line 133, and the circuit 26 (time point J). The signal B on the line 103 is transferred to the CPU through the bus 4. The CPU sends the end of the signal A to the line 102 through the bus 4 (time point K). The end of the signal A on the line 102 is given to the line 108 through the circuit 26, the line 113, and the circuit 31 at the time point L. The end of the signal A on the line 108 is sent to the I/O unit through the bus 5. In response to the end of the signal A, the I/O unit sends the signal B to the line 109 through the bus 5 (see the time point M). At the time point N, the end of the signal B on the line 109 is fed to the line 103 through the circuit 31, the line 133, and the circuit 26. The time point N corresponds to the end of one bus cycle.

Next, the third embodiment according to the present invention will be explained in detail with reference to FIG. 4. The elements in this figure which have an identical number to those in FIG. 3 perform a similar function. The operation of this embodiment is a three step process, the first checking for a unit on the same bus with a given destination address the second setting up a use right on the second bus if there is no response from the first bus in a given time and a third checking for a unit on the second bus. In the first step, when a unit connected to the first bus 4 changes the signal A on the line 102, the transfer control circuit 26 notifies a sending control signal time supervisor circuit 50 and a minimum time assurance circuit 51 of the change via the line 150. The time supervisor circuit 50 assures that a unit connected to the first common bus 4 promptly decodes the destination unit address (C) on the address bus 105. If the destination unit address is the same address as the source unit address, the unit connected to the first common bus 4 sends the response signal (B) to the common bus 4. Also the circuit 50 monitors the change ("1" to "0") of the signal (A) on the line 102. The response time of the unit connected to the first common bus 4 generally is a mean value time. Accordingly, if there is no response from a unit on bus 4 within the mean value time, it is assumed that there is no unit having the same unit address as the designation destination unit address that is connected to the first common bus 4. In the second step, if the circuit 50 detects no change ("1" to "0") in the signal A on line 102, that is no response within the mean value time, the circuit 50 sends the transmission request signal to circuit 29 via bus 151 to set up a "use right" for the second common bus 5 and the circuit 51. If there is a change ("1" to "0") of the signal A, the synchronizing control circuit 52 transmits a sending designation timing signal, for use with the transmission request signal to the circuit 50 via the line 161. In response to the request signal, the circuit 29 sets up the "use right" through the line 107. After completing the set up operation, the circuit 29 notifies the transfer control circuit 31 through the signal line 152 that use of the second common bus 5 is allowed and the control circuit 52 supplies a timing signal to circuit 31 via the line 159.

In the third step, in response to the allowance signal on line 152, circuit 31 also sends a sending designation timing signal to an address input/output circuit 33 and a data input/output circuit 35 via lines 144 and 145, respectively. Once the circuit is set up, a transfer control signal (A) is sent from the first common bus 4 to the second common bus 5 through the line 102, the circuit 26, the line 150, the circuit 21, the line 153, the circuit 31 and the line 108. Address information (C) is transferred from the first common bus 4 to the second bus 5 through the line 105, the circuit 32, the line 117, the circuit 33 and the line 111. A command signal (E) is transferred from the first common bus 4 to the second common bus 5 through the line 104, the circuit 26, the line 154, the circuit 31 and the line 110. Data (D) is transferred from the first common bus 4 to the second common bus 5 via the line 106, the circuit 34, the line 119, the circuit 35 and the line 112. The unit connected to the second common bus 5 examines the destination unit address in response to the change of the signal (A). If the unit itself were designated, the response control signal (B) from the line 109 is transmitted to the first common bus 4 via the circuit 31, the line 155, the circuit 26 an the line 103, and the unit responds to the address (C), so that the transfer operation is terminated. If the unit having the destination unit address was not connected to the second common bus 5, the signal (A) is transmitted from the line 120 to the line 108 via the circuit 26, the line 150, the circuit 51, the line 153 and the circuit 31. Accordingly, the transfer operation is forced to repeat.

If the transfer operation on the first common bus 4 was finished and the signal (A) on the line 108 was not changed during a period greater than the time period set by the circuit 51, the bus transfer operation is also terminated.

The response of the unit connected to the first common bus 4 may be significantly delayed and may be delivered during or after the time that the transfer on the second common bus terminates the transfer on the first common bus 4. If this situation occurs during the examination of the destination unit address in the unit connected to the second common bus 5 and the transmission on the second common bus 5 is terminated, the unit makes an error that causes misoperation. To solve this problem, in response to the signal on the line 152, the circuit 31 changes the signal on the line 108. Consequently, the circuit 51 keeps the signal changed on the line 108 during the minimum evaluation time, thus preventing the misoperation of the unit even if the signal A from the line 102 is changed. After the minimum time, if there were no response from the second common bus 5, the circuit 51 changes the signal on the line 108 and again terminates the transfer on the second common bus 5. Accordingly, in this embodiment, it is not necessary to have a memory for storing the address showing the unit connected to the second common bus 5.

It should be noted that in the description of the operation of the various embodiments provided herein, the operation of the transfer unit to control the flow of instructions only from one bus to another may have been described, however, such description is not intended to be limiting in any way. The invention clearly contemplates the flow of information from a first bus to a second bus and from the second bus to the first bus in a similar manner.

Figure 4:
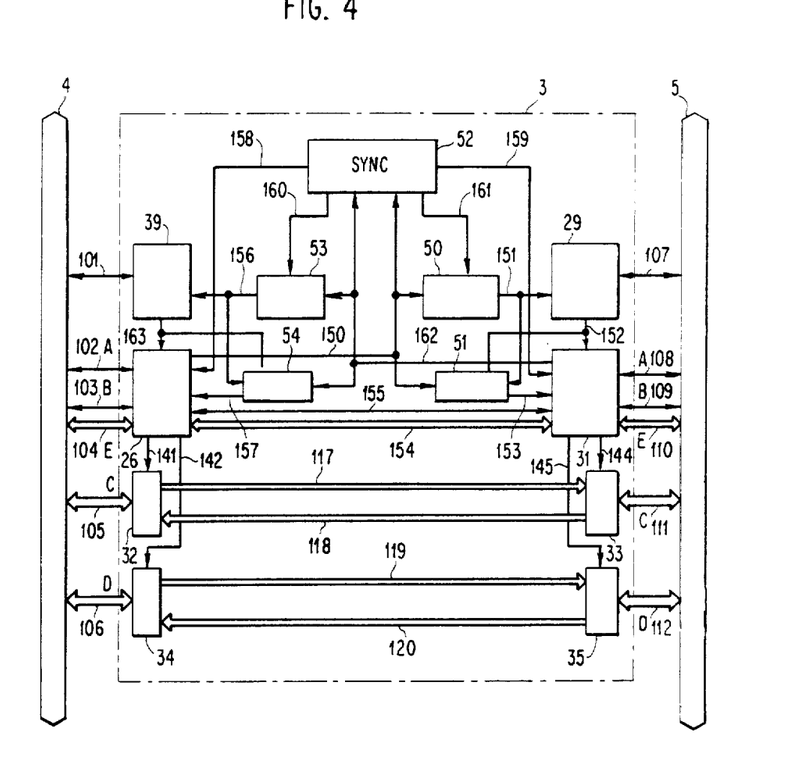
FIG. 4 shows a third embodiment of the present invention.

The bus transfer control unit 3 is able to operate in either direction, as evidenced by the fact that the right half of the unit shown in FIGS. 3 and 4 is the mirror image of the left half of the unit. Accordingly, comparable placed elements in each half would have the opposite function where signal flow is from the second to the first bus.

What is claimed is:

1. A transfer control unit connected to a plurality of common buses which together form an asynchronous communication system that permits the buses to be selectively operable in synchronism with each other, each of at least a first and second of said common buses having respective bus cycles and being connected to a respective central processing unit (CPU) and one or more respective peripheral units, each of said respective peripheral units having a unit address and being operative to generate transfer requests, said transfer control unit being able to read data, including input/output instructions, from at least one of said central processing units or write said data into at least one of said central processing units and one of said peripheral units, said transfer control unit comprising:

decision means, comprising a detection circuit for detecting signals on a bus, connected to at least said first and second common buses and operative for identifying a transfer request, comprising an input/output instruction, on at least one of said first and second common buses and for generating a first transfer request signal; and transmission means coupled between at least said first and second common buses for transmitting during one bus cycle of said first common bus a unit address, data and a control signal, for executing the input/output instruction detected by said detection circuit, to said second common bus, said transmission means comprising a first send line and a first reply line connected to said first common bus and a second send line and a second reply line connected to said second common bus, and being operative to carry send and reply signals which identify at least an existence of transfer requests on said first bus and establish said synchronism between said first and second buses;

time supervisor means responsive to a first transfer request signal and connected at least to said first common bus and said second common bus for supervising the time required to transfer data by said first common bus, during a first predetermined time beginning with an input of said first transfer request signal, and for generating and sending a second transfer request signal to said second common bus for facilitating the establishment of a link between said first and second bus systems via said transmission means, if there has been a passage of said first predetermined time without a generation of any response signal on said first common bus to said first transfer request; and minimum time assuring means operative in connection with said transmission means for assuring that there is sufficient time for a sending of data and address signals to said second common bus, said sufficient time being greater than a second predetermined time beginning with a change of address and data sending control signals on said second common bus, in order to compensate for a case when there is a response to said first transfer request on said first common bus after a second transfer is input on said first bus.

2. A transfer control unit connected to a plurality of common input/output bus systems which together form an asynchronous communication system that permits the buses to be selectively operable in synchronism with each other, each of said bus systems having at least one of a respective memory unit, a respective central processing unit and a respective peripheral unit, and a common input/output bus connected to each of the respective units for carrying, during respective bus cycles, command information and address, data, and control signals, including transfer requests and state information, said units in said bus systems having a respective relative priority with respect to each other and each said bus system having an individual bus "use right", said transfer control unit comprising:

transmission means coupled between a first of the common input/output buses and at least a second common input/output bus for transmitting, during one bus cycle of said first common input/output bus, address, data and control signals, to said second common input/output bus, said transmission means comprising a first send line and a first reply line connected to said first common input/output bus and a second send line and a second reply line connected to said second common input/output bus, and being operative to carry send and reply signals which facilitate said synchronism between said first and second buses;

decision means connected for deciding during said one bus cycle of said first common input/output bus whether the signals on said first common input/output bus should be transmitted to said second common input/output bus, in response to a command information from said first common input/output bus;

detection means for monitoring state information on the plurality of common input/output buses and for detecting during said one bus cycle whether a transfer request from said first common input/output bus collides with a transfer request from said second common input/output bus based on the state information monitored on said second common input/output bus when said decision means decides that the signals from said first common input/output bus should be transmitted to said second common input/output bus, and for generating an output identifying whether a collision is detected;

collision control means responsive to said detection means output for outputting a use right request signal to said second common input/output bus in a case of no detection of a collision by said detection means, and for outputting a dummy response control signal for the common input/output bus having a unit with a lower priority in a case of detecting a collision by said detection means; and dummy response control means for outputting a dummy response request signal in response to the dummy response control signal for indicting either invalid response or wait response to the common input/output bus with a unit having a lower priority.

3. A transfer control unit as claimed in claim 2 wherein said decision means comprises bus control means operative to receive and implement a transfer request to transfer information, including data, address and command information, from a CPU or peripheral unit on said first common input/output bus to a CPU or peripheral unit on said second common input/output bus during one bus cycle, said bus control means being operative to forward said data, address and command information; and said transfer control unit further comprises:

address storage means connected to said bus control means and operative to store address information identifying said CPU or a peripheral unit on said second common input/output bus;

data storage means connected to said bus control means and operative to store data concerning said CPU or a peripheral unit on said second common input/output bus; and input/output control means connected to and operating in conjunction with said bus control means and operative to be substantially independent of the CPU on one of said first common input/output bus or said second common input/output bus, for control of the transfer control unit receive, store and transmit operations.

4. The transfer control unit as claimed in claim 2 wherein said transfer control unit sends a use right signal to all buses having a lower priority than said bus in whose favor the collision is resolved that prevents transfer of data by said lower priority buses until said conflict is removed.

5. The transfer control unit as claimed in claim 2 wherein said transfer control unit is operative to establish a relative priority among said plurality of common buses, to detect a conflict in use of said buses and to resolve such conflict in favor of the one of said busses having the highest priority.

6. A transfer control unit as claimed in claim 2, wherein said detection means comprises bus control means operative to receive and implement a transfer request to transfer information, including data, address and command information, from a CPU or peripheral unit on said first common input/output bus to a CPU or peripheral unit on said second common input/output bus during one bus cycle; and said transfer control unit further comprises:

address storage means connected to said bus control means and being operative to store address information identifying the CPU or a peripheral unit on said second common input/output bus; and data storage means connected to said bus control means and operative to store data concerning said CPU or a peripheral unit on said second common input/output bus.

7. The transfer control unit as claimed in claim 2 wherein said collision control means generates dummy response request signals, which indicate and invalid response or wait response to those buses desiring access but having a lower priority.

8. A transfer control unit as claimed in claim 1, wherein said decision means comprises a bus control means operative to receive and implement a request to transfer information, including data, address and command information, from said CPU or peripheral units on said first common bus to said CPU or peripheral units on said second common bus during one bus cycle of said first common bus; and said transfer control unit further comprises:

address storage means connected to said bus control means and operative to store address information identifying the CPU or a peripheral unit on said second common bus;

data storage means connected to said bus control means and operative to store data concerning the CPU or a peripheral unit on said common bus; and input/output control means operative in conjunction with said bus control means, substantially independent of the CPU on either one of said first or second common buses, for control of the transfer control unit receive, store and transmit operations.

9. The transfer control unit as claimed in claim 1 wherein said time supervisor means includes means (50) for assuring that a sufficient time, greater than said predetermined period during transmission, is established for sending data when said response to said transmission is made.

* * * * *

UNITED STATES PATENT AND TRADEMARK OFFICE
CERTIFICATE OF CORRECTION

PATENT NO. : 4,958,271

DATED : 9/18/90

INVENTOR(S) : Yoshida et al

It is certified that error appears in the above-identified patent and that said Letters Patent is hereby corrected as shown below:

Column 6, line 32, change "'1"" to --"1"--.

Column 6, line 39, change "1'" to --"1"--.

Column 12, line 31, after "transfer", insert --request--;

Column 14, line 10, delete "detection", insert --decision--.

Signed and Sealed this

Eighth Day of September, 1992

Attest:

DOUGLAS B. COMER

Attesting Officer

Acting Commissioner of Patents and Trademarks